(12) United States Patent
Balasubramanian et al.

(10) Patent No.: US 10,594,639 B2
(45) Date of Patent: *Mar. 17, 2020

(54) TRANSMITTAL OF BLOCKED MESSAGE NOTIFICATION

(71) Applicant: International Business Machines Corporation, Armonk, NY (US)

(72) Inventors: Swaminathan Balasubramanian, Troy, MI (US); Ravi P. Bansal, Tampa, FL (US); Andrew R. Jones, Round Rock, TX (US); Brian M. O'Connell, Research Triangle Park, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/939,350

(22) Filed: Nov. 12, 2015

(65) Prior Publication Data

US 2016/0065518 A1 Mar. 3, 2016

Related U.S. Application Data

(63) Continuation of application No. 13/350,103, filed on Jan. 13, 2012, now Pat. No. 9,231,899.

(51) Int. Cl.
*G06F 13/00* (2006.01)
*H04L 12/58* (2006.01)

(52) U.S. Cl.
CPC .............. *H04L 51/12* (2013.01); *H04L 51/18* (2013.01); *H04L 51/24* (2013.01); *H04L 51/32* (2013.01); *H04L 51/14* (2013.01)

(58) Field of Classification Search
CPC ......... H04L 51/18; H04L 51/12; H04L 51/24; H04L 51/32; H04L 12/588;
(Continued)

(56) References Cited

U.S. PATENT DOCUMENTS 6,571,234 B1 5/2003 Knight et al.
6,650,890 B1 * 11/2003 Irlam ................... G06Q 10/107
455/412.1

(Continued)

OTHER PUBLICATIONS

Amar Toor, U.S. Might Use Facebook, Twitter to Broadcase Terrorism Alerts, Apr. 7, 2011, 1 page, http://www.switched.com/2011/04/07/u-s-might-use-facebook-twitter-to-broadcast-terrorism-alerts/.

(Continued)

*Primary Examiner* — Kenneth R Coulter
(74) *Attorney, Agent, or Firm* — Isaac Gooshaw, Esq.; George S. Blasiak, Esq.; Heslin Rothenberg Farley & Mesiti P.C.

(57) ABSTRACT

A method according to one embodiment is for transmitting a message. In one embodiment, one or more processor of a messaging system identifies a certain message of the messaging system, the certain message being a blocked message intended for transmission to a certain user of the messaging system. In one embodiment, the one or more processor further determines one or more of a popularity of content of the certain message and a relevance of content of the certain message to the certain user, the certain user being a prospective recipient of a message. In one embodiment, the one or more processor transmits a message to the certain user responsively to a result of the determining of the one or more of a popularity of content of the certain message and a relevance of content of the certain message to the certain user of the messaging system.

20 Claims, 5 Drawing Sheets

(58) Field of Classification Search
CPC . H04L 12/5855; H04L 51/14; H04L 12/5865;
H04L 65/1079; G06Q 10/10; G06Q
10/107; G06Q 50/01
USPC .......... 709/204–206, 223, 224; 715/751–759
See application file for complete search history.

(56) References Cited

U.S. PATENT DOCUMENTS

| | | | | |
|---|---|---|---|---|
| 7,307,997 | B2* | 12/2007 | Vinokurov | H04L 12/585 370/401 |
| 7,603,427 | B1* | 10/2009 | Horvitz | G06Q 10/107 709/207 |
| RE41,754 | E | 9/2010 | Knight | |
| 7,831,529 | B2* | 11/2010 | Horvitz | G06N 99/005 706/14 |
| 7,870,203 | B2* | 1/2011 | Judge | G06Q 10/107 709/201 |
| 7,937,468 | B2* | 5/2011 | Libbey | G06Q 10/107 709/206 |
| 8,583,740 | B2* | 11/2013 | Oswall | H04L 12/585 709/206 |
| 8,918,466 | B2* | 12/2014 | Yu | H04L 51/12 709/206 |
| 9,098,459 | B2* | 8/2015 | Davis | G06F 15/16 |
| 9,231,899 | B2* | 1/2016 | Balasubramanian | H04L 51/12 |
| 2003/0158905 | A1* | 8/2003 | Petry | H04L 12/585 709/206 |
| 2004/0215977 | A1 | 10/2004 | Goodman et al. | |
| 2005/0132060 | A1 | 6/2005 | Mo et al. | |
| 2005/0259667 | A1* | 11/2005 | Vinokurov | H04L 12/585 370/401 |
| 2005/0262209 | A1* | 11/2005 | Yu | H04L 51/28 709/206 |
| 2006/0155750 | A1 | 7/2006 | Fowler et al. | |
| 2006/0206573 | A1* | 9/2006 | Horvitz | G06Q 10/107 709/206 |
| 2006/0242708 | A1* | 10/2006 | Oswall | G06Q 10/107 726/24 |
| 2007/0027992 | A1* | 2/2007 | Judge | G06Q 10/107 709/227 |
| 2009/0013054 | A1* | 1/2009 | Libbey | G06Q 10/107 709/207 |
| 2009/0030857 | A1* | 1/2009 | Horvitz | G06N 99/005 706/12 |
| 2009/0064329 | A1 | 3/2009 | Okumura et al. | |
| 2010/0318620 | A1 | 12/2010 | Bansal et al. | |
| 2011/0153761 | A1 | 6/2011 | Anderson | |
| 2011/0191847 | A1* | 8/2011 | Davis | G06F 15/16 726/22 |
| 2012/0296965 | A1* | 11/2012 | Srivastava | G06Q 50/01 709/204 |
| 2013/0018972 | A1* | 1/2013 | Sargent | G06Q 10/10 709/206 |
| 2013/0060863 | A1 | 3/2013 | D'Eri et al. | |
| 2015/0381540 | A1* | 12/2015 | Sargent | G06Q 10/10 709/206 |

OTHER PUBLICATIONS

TweetVolume: Compare Popularity of Words on Twitter, posted on Nov. 7, 2008, 2 pages, http://www.makeuseof.com/dir/tweetvolume-popularity-twitter/.
Zee, Twitter's Search Results by Popularity Goes Live, Apr. 2, 2010, 2 pages, http://thenextweb.com/apps/2010/04/02/twitters-search-results-popularity-live/.
An Advanced Twitter Insight Tool, posted Jan. 8, 2011, 2 pages, http://www.makeuseof.com/dir/researchly-twitter-insight-tools/.
Andre Voget and Johannes Selbach, Free SEO News, Jan. 12, 2010 Newsletter, 7 pages, http://www.free-seo-news.com/newsletter404.htm.
Josh Catone, Twitter Better: 20 Ways to Filter Your Tweets, Jul. 3, 2009, 3 pages, http://mashable.com/2009/07/03/twitter-filter/.
Mike Phillips, Twopular: Find Hot Topics and Keywords on Twitter, posted on Mar. 3, 2009, 2 pages, http://www.websitemagazine.com/content/blogs/website_magazine_consumer_corner/archive/2009/03/03/twopular-find-hot-topics-and-keywords-on-twitter.aspx.
Trends on Twitter Aggregator, posted Jan. 29, 2011, 2 pages, http://twopular.com/.
Global Dossier Report for U.S. Appl. No. 14/939,350, filed Nov. 12, 2015, dated Nov. 11, 2019.
List of IBM Patent and/or Patent Applications treated as related for U.S. Appl. No. 14/939,350, filed Nov. 12, 2015, dated Nov. 11, 2019.

* cited by examiner

| NO. | SUBJECT | KEYWORDS |
|---|---|---|
| 1 | TENNIS | TENNIS PLAYER A<br>WIMBLEDON<br>US OPEN<br>TENNIS PLAYER B<br>CLAY COURT |
| 2 | POLITICS | OFFICIAL A<br>OFFICIAL B<br>OFFICIAL C<br>FILIBUSTER<br>SENATE |
| 3 | BUDGET | BUDGET<br>FINANCIAL<br>FORECAST |
| 4 | WEATHER | WEATHER<br>CLOUDY<br>TEMPERATURE<br>FORECAST |
| ⋮ | ⋮ | ⋮ |
| N | ⋮ | ⋮ |

FIG. 4

TRANSMITTAL OF BLOCKED MESSAGE NOTIFICATION

This application is a continuation of co-pending U.S. patent application Ser. No. 13/350,103, filed Jan. 13, 2012 (U.S. Pat. No. 9,231,899), entitled, "TRANSMITTAL OF BLOCKED MESSAGE NOTIFICATION" which is incorporated herein by reference in its entirety.

TECHNICAL FIELD

One or more aspects of the present invention relate to network applications, and more specifically, to a messaging application.

BACKGROUND

A social network is a social structure made up of individuals (or organizations) called "nodes" which are tied (connected) by one or more specific types of interdependency, such as friendship, kinship, common interest, financial exchange, dislike, beliefs or knowledge. In its simplest form, a social network is a map of specified ties, such as friendship, between the nodes being studied. The nodes to which an individual is thus connected are the social contacts of that individual. The network can also be used to measure social capital—the value that an individual gets from the social network. These concepts are often displayed in a social network diagram, where nodes are the points and the ties are the lines.

Examples of computer implemented social networks include TWITTER™, FACEBOOK™ email systems and blogs. Computer implemented social networks incorporate messaging systems that are capable of receiving and transmitting messages to client computers of participant users of the messaging systems.

SUMMARY

A method according to one embodiment is for transmitting a message. In one embodiment, one or more processor of a messaging system identifies a certain message of the messaging system, the certain message being a blocked message intended for transmission to a certain user of the messaging system. In one embodiment, the one or more processor further determines one or more of a popularity of content of the certain message and a relevance of content of the certain message to the certain user, the certain user being a prospective recipient of a message. In one embodiment, the one or more processor transmits a message to the certain user responsively to a result of the determining of the one or more of a popularity of content of the certain message and a relevance of content of the certain message to the certain user of the messaging system.

A computer program product according to one embodiment is for transmitting a message. The computer program product comprises one or more computer-readable tangible storage device. The computer program product further comprises program instructions, stored on at least one of the one or more tangible storage device for a processor to identify a certain message of the messaging system, the certain message being a blocked message intended for transmission to a certain user of the messaging system. The computer program product in one embodiment further comprises program instructions, stored on at least one of the one or more storage devices for a processor to determine one or more of a popularity of content of the certain message and a relevance of content of the certain message to the certain user, the certain user being a prospective recipient of a message. The computer program product in one embodiment further comprises program instructions, stored on at least one of the one or more storage devices for a processor to transmit a message to the certain user responsively to a result of the determining of the one or more of a popularity of content of the certain message and a relevance of content of the certain message to the certain user of the messaging system.

A computer system according to one embodiment is for transmitting a message. The computer system comprises one or more processors, one or more computer readable memories and one or more computer-readable tangible storage devices. The computer system further comprises program instructions, stored on at least one of the one or more storage device for execution by at least one of the one or more processor via at least one of the one or more memories, to identify a certain message of the messaging system. The computer system further comprises program instructions, stored on at least one of the one or more storage device for execution by at least one of the one or more processor via at least one of the one or more memories, to determine one or more of a popularity of content of the certain message and a relevance of content of the certain message to the certain user, the certain user being a prospective recipient of a message. The computer system in one embodiment further includes program instructions, stored on at least one of the one or more storage devices for execution by at least one of the one or more processors via at least one of the one or more memories, to transmit a message to the certain user responsively to a result of the determining of the one or more of a popularity of content of the certain message and a relevance of content of the certain message to the certain user of the messaging system.

A computer program product according to one embodiment is for transmitting a message. The computer program product comprises one or more computer-readable tangible storage device. The computer program product further comprises program instructions, stored on at least one of the one or more tangible storage device for a processor to identify a certain message of the messaging system. The computer program product in one embodiment further comprises program instructions, stored on at least one of the one or more storage devices for a processor to determine one or more of a popularity of content of the certain message and a relevance of content of the certain message to the certain user, the certain user being a prospective recipient of a message. The computer program product in one embodiment further comprises program instructions, stored on at least one of the one or more storage devices for a processor to transmit a message to the certain user responsively to a result of the determining of the one or more of a popularity of content of the certain message and a relevance of content of the certain message to the certain user of the messaging system.

BRIEF DESCRIPTION OF THE SEVERAL VIEWS OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

FIG. 4 is a representation of a text to subject database in one embodiment.

DETAILED DESCRIPTION

Figure 1:
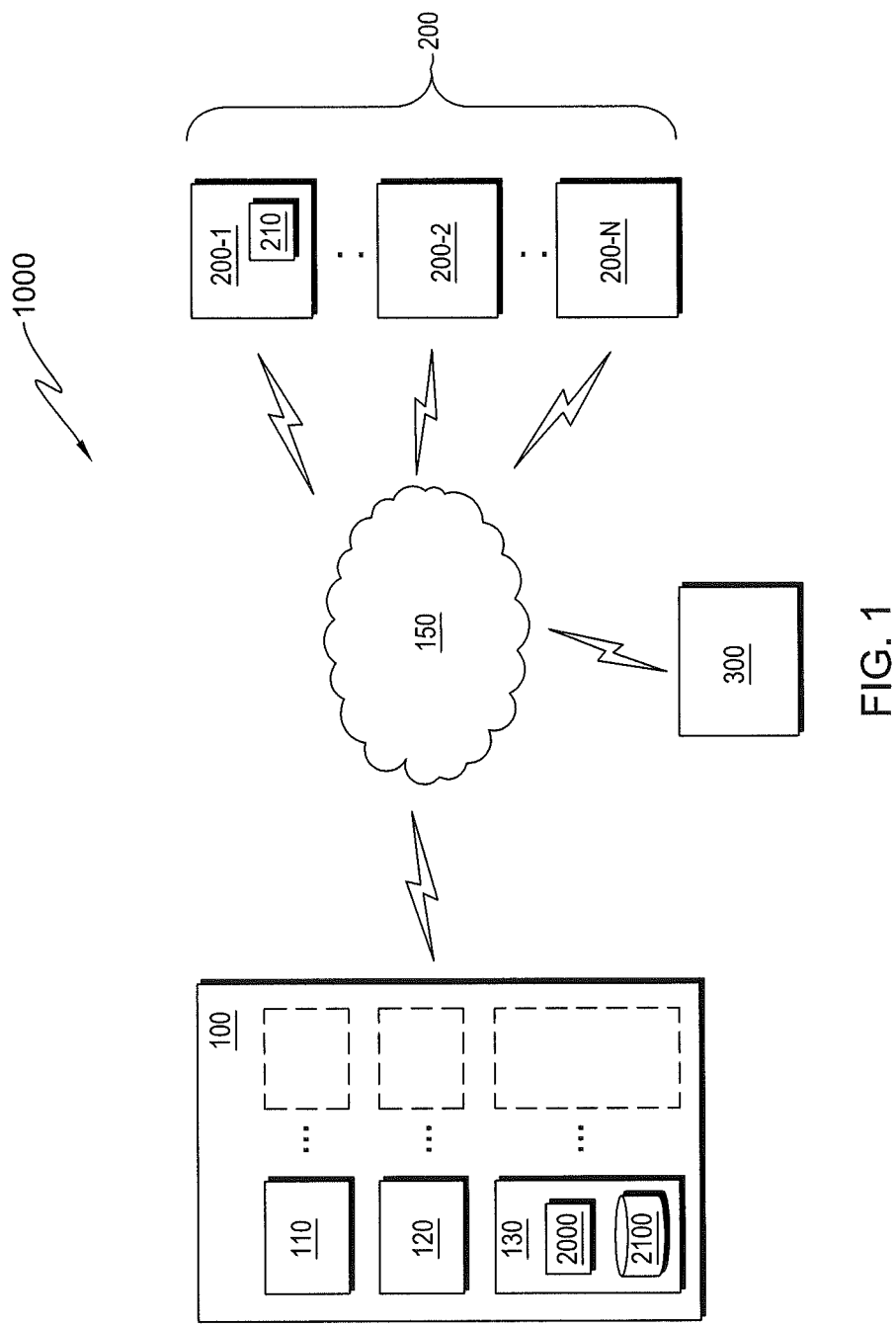
FIG. 1 depicts an exemplary block diagram of a system according to an illustrative embodiment of the disclosure.

Embodiments set forth herein are directed toward transmittal of messages. FIG. 1 depicts a block diagram of a data communication system 1000 having a messaging system 100 and a plurality of client computers 200. The plurality of client computers 200 include a first user computer 200-1 and other user computers 200-2, 200-N. In various embodiments set forth herein first user computer 200-1 refers to a user computer used by a recipient of a message transmitted by messaging system 100. Computers 200-2, 200-N refer to computers used by users of the messaging system 100 other than the recipient. In one embodiment, messaging system 100 includes a text to subject database 2100 for use in converting text of a message into a subject classification. In one embodiment, data communication system 1000 includes a hits count service system 300 which in one embodiment reports to messaging system 100 a hits count of hits by global Internet users on a certain Internet website.

Client computers 200 can be connected to messaging system 100 directly or via an intermediate network 150. Network 150 can be provided, for example, by the Internet, an enterprise intranet, a LAN, or a private or a public WAN. In one embodiment, network 150 can carry Internet Protocol (IP) traffic. Client computers 200-1, 200-2, 200-N can be provided by e.g., smart phones, tablet computers, laptop computers and/or personal computers.

Messaging system 100 in one embodiment includes one or more processor 110 and one or more memory 120 and one or more computer readable tangible storage device 130 that stores one or more program 2000 that can be executed by at least one of the one or more processor 110 for performance of the methods set forth herein. One or more program 2000 in one embodiment is stored in at least one of one or more memory 120. In one embodiment, one or more program 2000 is one of partially or entirely stored in at least one of one or more memory 120 during execution of one or more program 2000 by at least one of one or more processor 110. In one embodiment, one or more program 2000 is one or more program running on at least one of one or more processor 110. In one embodiment, text to subject database 2100 is stored on at least one of one or more computer readable tangible storage device 130. In one embodiment, text to subject database 2100 is stored in at least one of one or more memory 120. In one embodiment, at least one of one or more processor 110 executes one or more program 2000 for performance of a method set forth herein for transmitting messages. In one embodiment, a message is transmitted responsively to a determination that content of a message is popular. In one embodiment, one or more memory 120 includes one or more computer readable RAM and one or more computer readable ROM. In one embodiment, one or more computer readable tangible storage device 130 includes one or more of a magnetic disc storage device and a semiconductor storage device such as a ROM, EPROM or flash memory device.

In the development of one or more program 2000 it was determined that messaging systems such as messaging system 100 transmit messages having content that has "gone viral." There is set forth herein methods, computer program products and systems whereby a message is transmitted to a recipient if certain conditions are present. In one embodiment, a message is transmitted to a user of messaging system 100 responsively to a determination that content of a message of the messaging system 100 has "gone viral."

An embodiment of the logic to transmit a message is described with reference to FIG. 2. In one embodiment the logic of FIG. 2 is performed by one or more program 2000 executing on at least one of one or more processor 110 as shown in FIG. 1.

Figure 2:
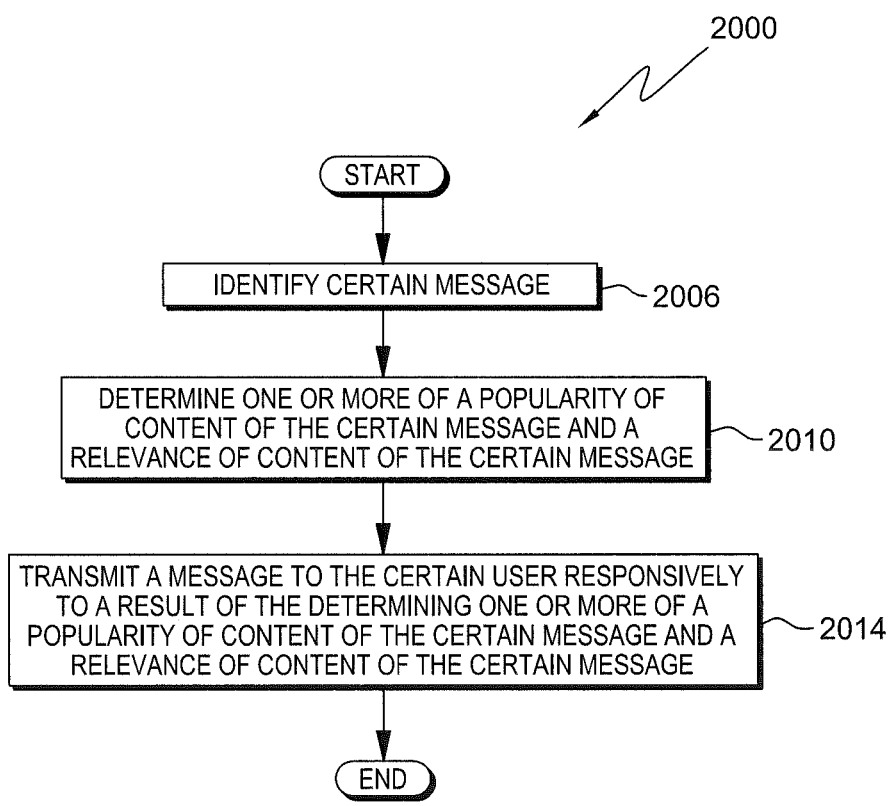
FIG. 2 depicts an exemplary flowchart of a method that is implemented in illustrative embodiments of the disclosure.

With reference to FIG. 2 one or more program 2000 at block 2006 identifies a certain message. At block 2010 one or more program 2000 determines one or more of a popularity of content of the certain message and a relevance of content of the certain message to a certain user of messaging system 100 who may be a prospective recipient. At block 2014 one or more program 2000 transmits a message to the certain user responsively to a result of the determining at block 2010. In one embodiment, one or more program 2000 at block 2006 identifies a certain message of messaging system 100. In one embodiment, one or more program 2000 at block 2010 determines one or more of a popularity of content of the certain message and a relevance of content of the certain message to a certain user of messaging system 100, the certain user being a prospective recipient of a message. In one embodiment, one or more program 2000 at block 2014 transmits a message to the certain user of the messaging system 100 responsively to a result of the determining at block 2010 of one or more of a popularity of content of the certain message and a relevance of content of the certain message to the certain user of the messaging system 100.

Figure 3:
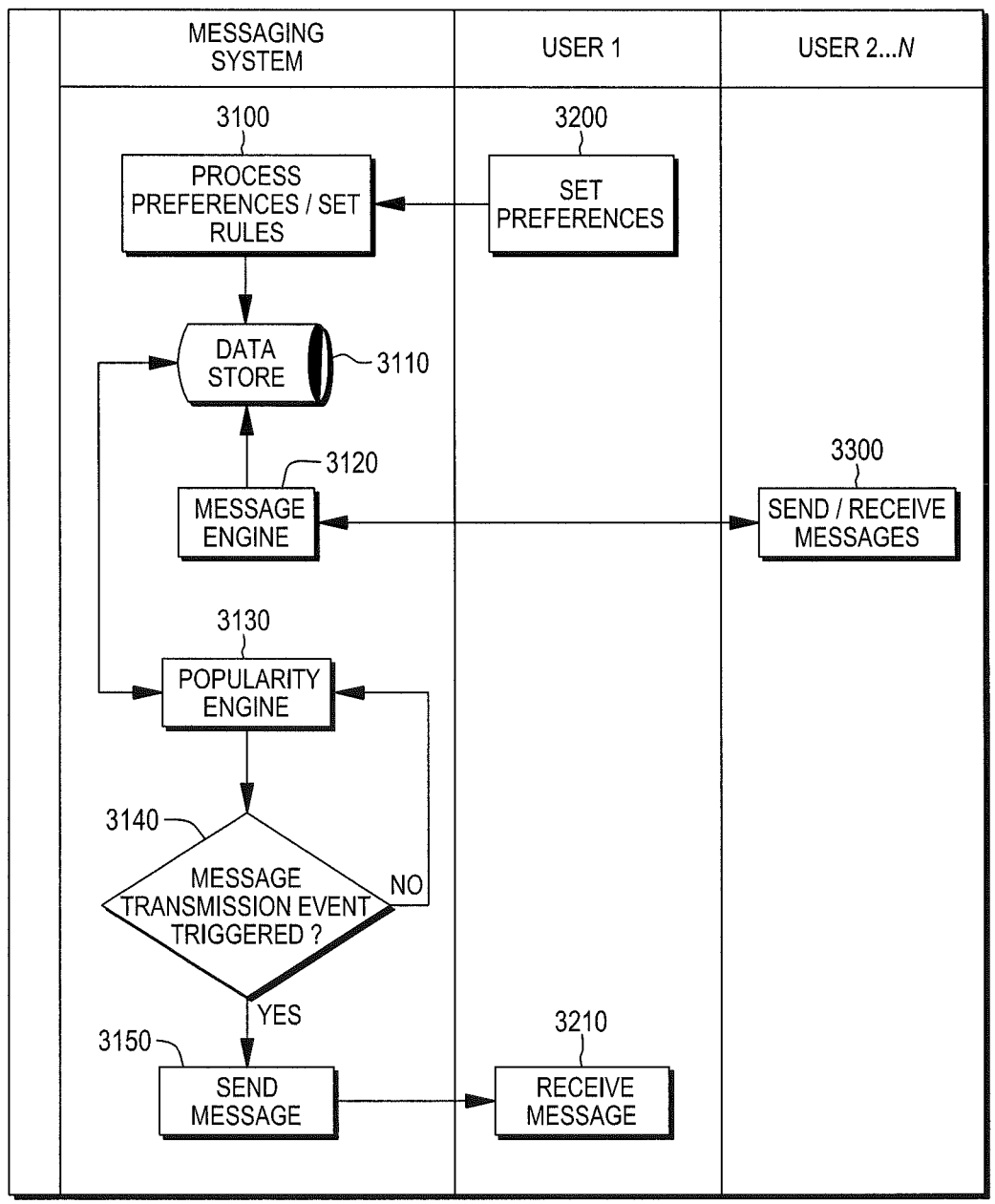
FIG. 3 is a diagram illustrating further aspects of a data communication system.

Various aspects of one or more program 2000 in different embodiments are described by way of example. In one example, one or more program 2000 conditionally transmits blocked messages to a user of messaging system 100 responsively to a popularity of content of the message. An example where blocked messages are conditionally transmitted is illustrated with reference again to the general flow diagram of FIG. 2 and to the diagram of FIG. 3. In the example of a blocked message that is conditionally transmitted responsively to determined popularity, one or more program 2000 at block 2006 in identifying a certain message identifies the certain message as being a blocked message intended for transmission to a user but which is filtered according to user preferences (block 3100) of the user as may be input by a user (block 3200) and stores content of the message (e.g., partial content, entire content) into data store 3110. In one embodiment data store 3110 is provided by at least one of the one or more tangible data storage device 130 of messaging system 100 as set forth in FIG. 1. In one embodiment, data store 3110 is provided by at least one of the one or more memory 120 of messaging system 100. The blocked message in one embodiment is a certain message transmitted by a message engine 3120 of messaging system 100 input into messaging system 100 by a user (block 3300). At block 2010 one or more program 2000 in determining one or more of a popularity of content of the certain message and a relevance of content of the certain message to a certain user who in one embodiment is prospective recipient, determines a popularity of content of the certain message. A popularity engine 3130 of messaging system 100 outputs a result to decision block 3140. In one embodiment, one or more program 2000 at block 2014 in transmitting a message (block 3150) to a certain user of messaging system 100 transmits one or more of the certain message identified by one or more program 2000 at block 2006 and a message relating to a certain message. A message relating to a certain message in one embodiment includes a notification to the certain user that content of the certain message, e.g., a referenced website of the certain message has become popular. Messaging system 100 in one embodiment in transmitting a message (block 3150) to a recipient sends the message to a user of messaging system 100 to whom the blocked message filtered at block 2006 was intended. In one embodiment, a certain user receives a message (block 3210) e.g., at client computer 200-1. More specific examples of the use case where one or more program 2000 is used to transmit messages are described with reference to Examples 1 and 2.

Functions described with reference to the flow diagram of FIG. 2 are implemented using TWITTER™ as messaging system 100. One or more program 2000 in the performance of block 2006 to identify a certain message identifies the certain message as a blocked message of messaging system 100 and blocks a message intended for a recipient responsively to a determination that the recipient has not received the message and further responsively to the message not satisfying user preference of the recipient. The user preference in the embodiment of Example 1 is that a TWITTER™ message is not to be received by the user between designated times of a day, e.g., for precluding messages from being received in the middle of the night. Further in performance of block 2006 to identify a message, one or more program 2000 stores the message in data store 3110.

One or more program 2000 for performance of block 2010 to determine one or more of a popularity of content of a message and a relevance of content of the certain message to a certain user of the system that is a prospective recipient of a message determines a popularity of content of the message identified at block 2006. One or more program 2000 at block 2010 in the specific embodiment of Example 1, determines that content of the message is popular by counting a number of full message transmission, e.g., the number of times the certain TWITTER™ message identified at block 2006 is transmitted by system 100 from a source to a recipient and comparing the count to a threshold. In the embodiment of Example 1, one or more program 2000 at block 2010 outputs a result that a message is popular if the count exceeds the threshold. In the specific embodiment of Example 1, the count of transmission of the certain message includes counting only original transmissions from a TWITTER™ message source to users of the messaging system 100. In another embodiment the count of transmissions further includes forwarding and replies to direct transmission of a TWITTER™ message.

One or more program 2000 performs block 2014 to transmit a message to the certain user responsively to a determination that a message is popular by transmitting to the certain user the identified certain message blocked by one or more program 2000 in performance of block 2006. The certain user is thus made aware that the previously blocked certain message has become popular.

Functions described with reference to the flow diagram of FIG. 2 are implemented using an email system as messaging system 100. One or more program 2000 for performance of function block 2006 to identify a certain message identifies a blocked message as the certain message and blocks a message intended for transmission to a user responsively a determination that the recipient has not received the message and further responsively to the message not satisfying user preference of the recipient. The user preference in the specific embodiment of Example 2 is that messages transmitted from another certain user of messaging system 100 are not to be received. In performance of block 2006 to identify a certain message, the one or more program 2000 stores content of the message in data store 3110.

One or more program 2000 for performance of block 2010 to determine one or more of a popularity of content of a message and a relevance of content of the message to a certain user of the system that is a prospective recipient of the message determines that content of the certain message identified at block 2006 is popular. To determine a popularity of content of the certain message, one or more program 2000 at block 2010 examines the message for inclusion of a website, hyperlink, transmits an identifier (e.g., a URL) of the website hyperlink to a website hits count service system 300 (FIG. 1) that tracks requests for web pages of certain websites by global users of the Internet and receives a result of a number of hits on the certain website from hits count service system 300. In the embodiment of Example 2, one or more program 2000 uses a number of hits on a website to determine popularity. If the number of hits exceeds a threshold, one or more program 2000 at block 2010 outputs the result that content of the message is popular.

One or more program 2000 performs block 2014 to transmit a message responsively to a result of the determination of one or more of the popularity of content of the identified message the relevance of content of the identified message to a certain user by transmitting the message responsively to a result of the determination of popularity. The message transmitted by one or more program 2000 at block 2014 is a message relating to the certain message in the form of a message to the certain user informing that a hyperlink of blocked message is popular, the message including the website hyperlink.

Various methods for determining popularity of content of a message have been set forth herein. In Example 1, one or more program 2000 in determining popularity of content of a certain message at block 2010 examines full content transmissions of a certain message identified at block 2006 (a number of transmissions). In the embodiment of Example 1, determining popularity includes counting a total number of transmissions of a certain message from a source to a recipient. In another embodiment one or more program 2000 in determining a popularity of content of a message by way of counting message transmissions further includes counting one or more of a number of forwards of the certain message by recipients and replies to messages by recipients.

In the embodiment of Example 2 herein, one or more program 2000 in determining popularity of content of a message at block 2010 utilizes a partial content of a message, namely a website hyperlink of a message. In another example, one or more program 2000 at block 2010 in determining a popularity of content of a message using a partial content of a message examines a subject of the certain message identified at block 2006. In one particular example, a message identified at block 2006 is a TWITTER™ message. TWITTER™ messages include hashtags. Hashtags are one word identifiers of a subject matter classification of a message. One or more program 2000 at block 2010 in one embodiment in determining a popularity of content of a message, counts hashtags of TWITTER™ messages transmitted by messaging system 100 having hashtags corresponding to the message identified at block 2006, compares the count to a threshold and outputs a result that content of the message is popular if the count exceeds a threshold. In one example, one or more program 2000 blocks a message at block 2006 responsively to user preferences and overrides the block to transmit the message responsively to determination that the message includes a certain hashtag determined to be popular by counting of messages transmitted by messaging system 100 having the certain hashtag and outputting a result that content of the message is popular if the count exceeds a threshold. A user is accordingly made aware of a blocked message having a subject that has become popular.

In one embodiment, one or more program 2000 utilizes a text to subject database 2100 in determining a popularity of content of a message. In one example, one or more program 2000 determines popularity of content of a message at block 2010 by performing subject classification of the identified message identified at block 2006 and other messages transmitted by messaging system 100 and by counting transmissions of messages by the certain user and by others of messaging system 100 having subjects in common with that of the identified message identified at block 2006. A use by one or more program 2000 of a subject classification (e.g., with use of hashtags or by use of text to subject database 2100) of a message in one embodiment is regarded as a use by one or more program 2000 of a partial content of a message. One or more program 2000 at block 2010 in one embodiment outputs a result that a content of a message is popular if a count of a message subject classification exceeds a threshold. An exemplary text to subject database 2100 is represented in FIG. 4. Referring to database 2100, database 2100 in one embodiment is used to convert text to a subject classification. In one embodiment, database 2100 comprises a table having a column 2106 of textual words (keywords) correlated to N subjects listed in column 2110. Using database 2100 in one embodiment, one or more program 2000 classifies a given message by subject by examining textual words of one or more of a message subject line and body. Using database 2100 one or more program 2000 classifies a message into one of the N subjects responsively to a highest percentage of matches of textual words. For example if 25 percent of the textual words of a message match to subject No. 4 "weather" and 60 percent of the textual words of a message match to subject No. 2 "politics" and less than 60 percent of the textual words match to each other candidate subject classification the message is classified as belonging to the "politics" subject classification.

In one embodiment of one or more program 2000 performing a popularity determination at block 2010, one or more program 2000 utilizes a time criteria. For example a message content is determined to be popular if a count (e.g., a number of messages transmitted, number of hits, number of common hashtags) exceeds a threshold over a given time period. The time period in one example is a time period commencing prior to the commencing of the determining of popularity and ending either at the time of commencing of the determining of popularity or a time after the commencing of the determining of popularity. The time period in one example is a time period commencing at the commencement of the determining of popularity and ending at a time after the commencement (e.g., after a time out). The time period in another example is a time period of predetermined duration at an arbitrary time commencing after the commencement of the determining of popularity at block 2010 (e.g., a content of a message is determined to be popular if there are a number of transmissions of the message through a system 1000 within the time period, a "spike" in popularity commencing a time after the commencement of the determining of popularity at block). Such determining of popularity including determining whether there is a "spike" in popularity of content of a message can be regarded as a popularity determination responsive to a rate of an event examined for determining popularity (e.g., message transmission, website hyperlink hits, common hashtag message transmissions).

In the embodiment of Examples 1 and 2 one or more program 2000 in performing block 2010 to determine one or more of a popularity of content of a certain message and a relevance of content of the message to a certain user of messaging system 100 determines a popularity of content of a certain message but does not determine a relevance of content of the certain message to a certain user of messaging system 100. In other embodiments, one or more program 2000 in the performance of block 2010 determines popularity of content of a certain message and determines a relevance of content of the certain message to a certain user of messaging system 100. In the development of one or more program 2000 it was determined that a desirability of receiving a message that is or has become popular is increased if the message includes content more relevant to the certain user and conversely is decreased if the message includes content less relevant to the certain user. In one embodiment one or more program 2000 at block 2014 transmits a message responsively to a determination at block 2010 of a popularity of content of a certain message and further responsively to a determination at block 2010 of a relevance of content of the certain message to a certain user of messaging system 100 who is a prospective recipient of a message. It has been mentioned that a popularity of content of a message is determined responsively to a threshold being exceeded for example whether a number of message transmissions (e.g., one or more of original message transmissions, forwards, and replies) exceeds a threshold, whether a number of website hyperlink hits exceeds a threshold.

In one embodiment, one or more program 2000 at block 2110 utilizes a determination of relevance as an input to the determining of popularity, e.g., by increasing a threshold used for determining popularity if a message has content determined to be less relevant and decreasing a threshold used for determining popularity if a message has content determined to be more relevant. In one embodiment, one or more program 2000 assigns numerical scores of relevance to message content for which relevancy determination is performed, and uses the numerical score to adjust a threshold used for determining popularity. In such manner a message is transmitted responsively to a determination of popularity of content of the certain message and further responsively to a determination of a relevance of content to a certain user. In another embodiment one or more program 2000 for transmitting a message at block 2014 responsively to a determination of content of a certain message and further responsively to a determination of relevance of content to a certain user transmits a message at block 2014 if each of a criteria used for determining popularity (e.g., a count) and a criteria used for determining relevance (e.g., a relevance score) exceeds a predetermined threshold. In one embodiment, one or more program 2000 in performance of block 2010 to determine one or more of a popularity of content of a message and relevance of content of the certain message determines a relevance of content without determining a popularity of content of the message, transmits a message to a certain user responsively to a relevance of content of the message without the transmission of the message also being responsive to a determination of popularity of content of the message. For example, one or more program 2000 in one embodiment is established so that one or more program

2000 at block 2014 transmits a message responsively to a high relevance score (e.g., above a threshold) without determining of popularity of content of the message.

In one embodiment, one or more program 2000 in determining whether content of a message is relevant to a certain user at block 2110 examines geographic preference data of the certain user input into messaging system 100 by the certain user. For example, when registering with a messaging system 100 a user in one embodiment indicates geographic preference data, e.g., by presenting to messaging system 100 a primary residence or business address of the user. One or more program 2000 to determine a relevance of content of a certain message determines whether a certain message of which the certain user is a prospective recipient of a message relates to an area of geographic relevance of the certain user as determined by examining preferences of the certain recipient. One or more program 2000 in determining an area of geographic relevance of a certain user in one embodiment utilizes text to subject database 2100, e.g., by converting text of accessed preference files having location information into the one of N subject matter classifications listed in column 2110 of database 2100 which classifications listed in column 2110 include geographic location classifications in one embodiment. Messaging system 100 is established in one embodiment to be continually providing a relevance score for each location classification of the N subject classifications listed in column 2110 of database 2100 by examining location preferences for each user of messaging system 100. In one example a message including the text "Chicago shuts down all schools for the rest of the year" may have a popularity score (e.g., a count used to determine otherwise popularity) indicative of being popular. However, such message may not have a relevancy score sufficient for triggering a transmission of a message to a resident of Birmingham, Ala.

In another example, one or more program 2000 determines relevance of content of a certain message to a certain user at block 2110 by examining message history data of a certain user. To determine message history data of a certain user, one or more program 2000 examines a content of subject matter of messages transmitted by the certain user and or received by the certain user. In one example, messages forwarded and replied to are TWITTER™ messages having hashtags indicating a subject classification of a message. In one example, one or more program 2000 at block 2010 determines that a certain message identified by one or more program 2000 at block 2006 is relevant if a number of messages forwarded or replied to by a certain user have hashtags in common with a hash tag of the certain message identified by one or more program 2000 by execution of block 2006. Instead of using hashtags to determine a subject of messages transmitted by messaging system 100 and of the certain message, one or more program 2000 at block 2006 in one embodiment determines a subject of messages transmitted by or to a certain user utilizing text to subject database 2100 to convert text of a message to one of N subject matter classifications. Messaging system 100 is established in one embodiment to be continually providing a relevance score for each of the N subject classifications of database 2100 by examining message transmissions (to and/or from) of each user of messaging system 100.

In one embodiment, one or more program 2000 examines personal activity data of a certain user to determine whether content of a message is relevant to a certain user who is a prospective recipient of a message. To determine personal activity data of a certain user, one or more program 2000 in one embodiment examines content accessed by a certain user including Website access history, bookmarks and activities on smart phones. In one embodiment an activity examined on the certain user's smart phone is consumer product information as indicated by decoded bar code messages determined by decoding consumer product bar codes using a client computer, e.g., 200-1 which can be provided in one embodiment by a smart phone. One or more program 2000 in determining activity of a certain user in one embodiment utilizes text to subject database 2100, e.g., by converting text of accessed websites or files into the one of N subject classifications listed in column 2110 of database 2100. Messaging system 100 is established in one embodiment to be continually providing a relevance score for each of the N subject classifications listed in column 2110 of database 2100 by examining personal activities data for each user of messaging system 100. In one example, a message including the text "New York Yankees trade Alex Rodriguez to Boston Red Sox" may have a popularity score otherwise indicative of being popular but not have a sufficient relevancy score determined using one or more of message history or personal activity sufficient to trigger transmission to a certain user who has shown no interest in baseball.

In one embodiment, one or more program 2000 examines social activity data of a certain user for determining at block 2010 whether content of a message is relevant to a certain user. To determine a certain user's social activity data one or more program 2000 in one embodiment examines contacts of the certain user. In one embodiment, if one or more program 2000 determines that a message is relevant to one contact one or more program 2000 determines that a message is relevant to all contacts. One or more program 2000 in determining social activity data of a certain user utilizes text to subject database 2100, e.g., by converting text of accessed contact files into the one of N subject classifications of database 2100. Messaging system 100 is established in one embodiment to be continually providing a relevance score for each of the N subject categories listed in column 2110 of database 2100 by examining contacts or other social activity files for each user of messaging system 100.

In one embodiment, one or more program 2000 determines a present location indicating the present location of the certain user to determine at block 2010 whether content of a message is relevant to a certain user. To determine present location data of a user one or more program 2000 in one embodiment utilizes a location of a recipient's computer, e.g., computer 200-1. Computer 200-1 in one embodiment utilizes a location determining device 210 e.g., a GPS device to determine location and reports a location to messaging system 100. An ISO Layer 2 Network in which computer 200-1 participates in one embodiment determines a location of computer 200-1 by triangulation and reports the location to messaging system 100. To determine whether content of a message is relevant to a certain user based on a present location of a certain user, one or more program 2000 determines a location of a certain user's computer 200-1 and also determines whether a message includes location content, e.g., regarding a weather event at a particular location, a hash tag relating to the location. One or more program 2000 in determining a location category of a certain message at block 2010 in one embodiment utilizes text to subject database 2100, e.g., by converting text of a message into a subject matter category of the one of N subject classifications listed in column 2110 of database 2100 relating to location. In one example, a message having the text "all New York restaurants are giving away free food today may have a popularity score otherwise indicative of being popular but may not have a relevancy score sufficient to trigger transmission to a certain user presently located in Sydney, Australia.

In one embodiment, one or more program 2000 determines current availability data of a certain user to determine at block 2010 whether content of a message is relevant to a certain user. To determine current availability data indicating whether a certain user is available, one or more program 2000 in one embodiment examines a calendar of the certain user. In one example, a message having the text "Thanksgiving party today for all employees at the Company A CEO's office" may have a popularity score otherwise indicative of being popular but may not have a relevancy score sufficient to trigger transmission to a certain user who is on vacation.

Several examples of criteria for use by one or more program 2000 in determining relevancy of content of a certain message to a certain user are set forth herein including the criteria of (a) a certain user's geographic preference, (b) a certain user's message history, (c) a certain user's personal activities, (d) a certain user's social activities, (e) a certain user's present location, and (f) a certain user's availability. In one embodiment, one or more program 2000 at block 2010 determines a prioritization or scoring of the criteria (a) (b) (c) (d) (e) and (f) for a certain user by determining whether the certain user gave more preference to certain ones of criteria (a) (b) (c) (d) (e) and (f) over other ones of the criteria, e.g., by examining a message history or other historical data of messaging system 100 of the certain user. In one embodiment, one or more program 2000 at block 2010 examines historical data of messaging system 100 to determine prioritization or scoring of the criteria (a) (b) (c) (d) (e) and (0 in determining a relevance of content of a certain message to a certain user. In one embodiment, one or more program 2000 utilizes a user defined priority or scoring of the criteria (a) (b) (c) (d) (e) and (f) in determining a relevance of content of a certain message to a certain user.

In various embodiments set forth herein, one or more program 2000 in identifying a certain message at block 2006 identifies a blocked message which one or more program 2000 blocks in performing block 2006. In various other embodiments, one or more program 2000 in identifying a message at block 2006 identifies a message other than a blocked message. In one example, one or more program 2000 at block 2006 in identifying a message identifies a message received by a user of messaging system 100. In one example, one or more program 2000 at block 2006 in identifying a certain message identifies a transmitted message transmitted by a user of messaging system 100. An embodiment in which one or more program 2000 identifies at block 2006 a message other than a blocked message is set forth in the embodiment of Example 3.

Functions described with reference to the flow diagram of FIG. 2 are implemented using an email system as messaging system 100. One or more program 2000 for performance of function block 2006 to identify a certain message identifies a message transmitted by a certain user of the email messaging system 100 as the certain message. In a specific example, one or more program 2000 at block 2006 identifies a sent email message transmitted by a user as the certain message responsively to the user activating transmission of the message.

One or more program 2000 for performance of block 2010 to determine one or more of a popularity of content of a message and a relevance of content of the message to a certain user of the system that is a prospective recipient of the message determines that content of the message is popular. To determine a popularity of content of the certain message one or more program 2000 at block 2010 examines the message for inclusion of a website hyperlink and transmits the identification of the hyperlink to a hits count service system 300 (FIG. 1) that tracks requests for pages of certain websites by global users of the Internet and one or more program 2000. Further at block 2010, one or more program 2000 receives a hit count from hit count service system 300. One or more program 2000 uses a number of hits on a website to determine popularity. If the number of hits exceeds a threshold, one or more program 2000 at block 2010 determines and outputs the result that content of the message is popular.

One or more program 2000 performs block 2014 to transmit a message responsively to a result of the determination of one or more of the popularity of content of the identified message the relevance of content of the identified message to a certain user by transmitting the message responsively to a result of the determination of popularity including examining a number of website hit counts. The message transmitted by one or more program 2000 at block 2014 is a message in the form of a message to the certain user indicating that a hyperlink of a message transmitted by the user via an email message has become popular with the message further including the hyperlink.

Figure 5:
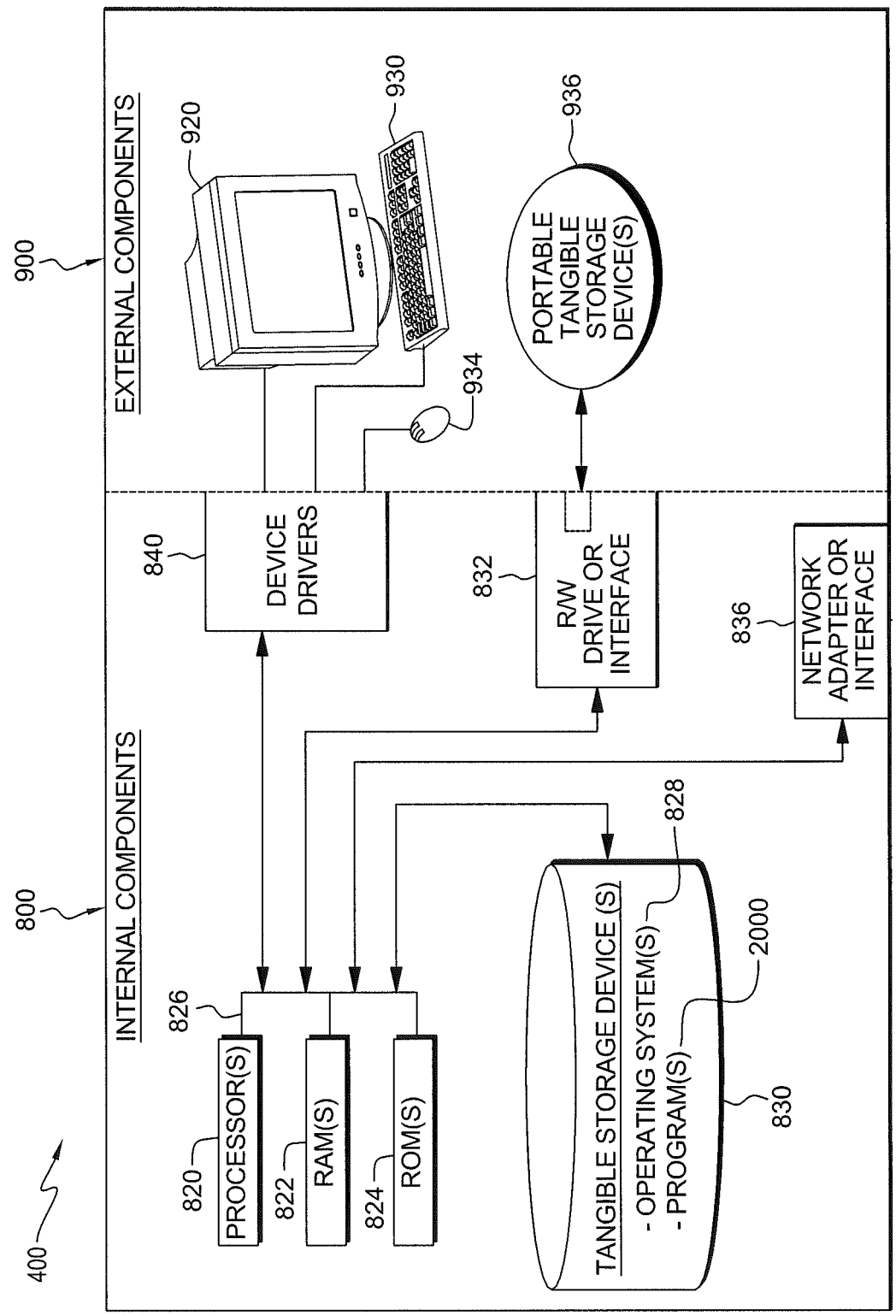
FIG. 5 is a hardware overview of a computer according to an illustrative embodiment of the disclosure.

FIG. 5 illustrates hardware and software components of an exemplary computer 400. In one embodiment one or more computer of messaging system 100 and client computers 200 as well as one or more computer of hits count service system 300 can be provided in accordance with computer 400 as shown in FIG. 5.

Computer 400 includes a set of internal components 800 and a set of external components 900. Set of internal components 800 include one or more processor 820, one or more computer-readable RAM 822 and one or more computer-readable ROM 824 connected on one or more buses 826, and one or more operating system 828 and one or more computer-readable tangible storage device 830. The one or more operating system 828 and one or more program 2000 are stored on one or more of the computer-readable tangible storage device 830 for execution by one or more of the processors 820 via one or more of the one or more RAM 822 (which typically include cache memory). In the embodiment illustrated in FIG. 2, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

In one embodiment one or more processor 110 of messaging system 100 as set forth in FIG. 1 is provided by one or more processor 820 as set forth in FIG. 5. In one embodiment one or more memory 120 as set forth in FIG. 1. is provided by the combination of the one or more RAMs 822 and the one or more ROMs 824 as set forth in the embodiment of FIG. 5. In one embodiment, the one or more computer readable tangible storage device 130 is provided by the one or more computer readable tangible storage device 830 as set forth in the embodiment of FIG. 5.

Set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The one or more program 2000 can be stored on one or more of the portable computer-readable tangible storage devices 936, read via R/W drive or interface 832 and loaded into hard drive 830. In one embodiment, a memory store 1110 of messaging system 100 is provided by one or more tangible storage device 830.

Set of internal components 800 also includes a network adapter or interface 836 such as a TCP/IP adapter card. The one or more program 2000 can be downloaded to computer 400 from an external computer via a network (for example, the Internet, a local area network or other, wide area network) and network adapter or interface 836. The external computer can include one or more tangible storage device 830 that stores the one or more programs. From the network adapter or interface 836, the one or more program 2000 is loaded into hard drive 830. The network may comprise copper wires, optical fibers, wireless transmission, routers, firewalls, switches, gateway computers and/or edge servers.

Set of external components 900 includes a computer display monitor 920, a keyboard 930, and a computer mouse 934. Sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The one or more program 2000 can be written in various programming languages including low-level, high-level, object-oriented or non object-oriented languages. The one or more program 2000 in one embodiment includes a single program an in another embodiment includes a plurality of programs. In one embodiment, the one or more program 2000 includes a plurality of programs wherein each of the functional blocks 2006, 2010, 2014 is provided by a different program. In one embodiment, the one or more program 2000 includes a program where each of the functional blocks 2006, 2010, 2014 is provided by different routine of a single program. Alternatively, the functions of one or more program 2000 can be implemented in whole or in part by computer circuits and other hardware (not shown).

Based on the foregoing, a computer system, method and program product have been disclosed for transmitting blocked messages. However, numerous modifications and substitutions can be made without deviating from the scope of the present invention. Therefore, the present invention has been disclosed by way of example and not limitation.

What is claimed is:

1. A method of transmitting a message, the method comprising:
one or more processor of a messaging system identifying a certain message of the messaging system as a blocked message intended for transmission to a certain user of the messaging system that is blocked from being transmitted to the certain user, the certain user being a prospective recipient of the certain message, the one or more processor blocking the certain message from being transmitted to the certain user, the blocking including storing the certain message into a data store;
the one or more processor determining a popularity of content of the certain message;
the one or more processor overriding the blocking to perform transmitting the certain message stored in the data store to the certain user responsively to a result of the determining a popularity of content of the certain message so that the certain user is made aware that the certain message has become popular, wherein the one or more processor in the determining a popularity of content of the certain message determines a count of message transmissions of the certain message by the messaging system of the certain message within a time period, and determines that that certain message has become popular based on the messaging system observing a threshold exceeding count of transmissions of the certain message within the time period.

2. The method of claim 1, wherein the method includes the one or more processor determining a relevance of content of the certain message to the certain user, and wherein the one or more processor performs the transmitting the certain message stored in the data store to the certain user responsively to a result of the determining the popularity of content of the certain message and the determining a relevance of content of the certain message to the certain user.

3. The method of claim 1, wherein the method includes the one or more processor determining a relevance of content of the certain message to the certain user, and wherein the one or more processor performs the transmitting the certain message stored in the data store to the certain user responsively to a result of the determining the popularity of content of the certain message and the determining a relevance of content of the certain message to the certain user, wherein the one or more processor in the determining a popularity of content of the certain message determines a count of message transmissions by the messaging system of the certain message, wherein the count of messages comprises a count of each of (a) original message transmissions of the certain message, (b) forwards of the certain message and (c) replies to the certain message.

4. The method of claim 1, wherein the one or more processor in the determining a popularity of content of the certain message examines a rate of transmissions of the certain message by the messaging system and determines that the certain message has become popular based on an observing of an increase in the rate of transmissions of the certain message by the messaging system.

5. The method of claim 1, wherein the one or more processor in the determining a popularity of content of the certain message determines the popularity of content of the certain message utilizing a website hyperlink of the certain message and results obtained from a website hits count tracking service, wherein determining a popularity of content of the certain message includes using hits count results from the hits count tracking service.

6. The method of claim 1, wherein the determining a popularity of content of the certain message includes determining that the certain message has become popular based on the messaging system determining that transmitted messages of the messaging system by the certain user and other users having a certain subject classification exceeds a threshold, and further determining that a subject matter classification of the certain message matches the certain subject matter classification.

7. The method of claim 1, wherein the method includes the one or more processor overriding the blocking to perform transmitting of a notification together with the certain message stored in the data store to the certain user responsively to the determining a popularity of content of the certain message, the notification specifying that the certain message has become popular.

8. The method of claim 1, wherein the count of transmissions comprises a count of one or more of the following selected from the group consisting of: original message transmissions of the certain message, forwards of the certain message and replies to the certain message.

9. The method of claim 1, wherein the one or more processor for determining a popularity of content of the certain message examines a rate of transmissions of the certain message by the messaging system to detect an increase in the rate of transmissions of the certain message and determines that content of the certain message has become popular based on an observing of a spike in a number of transmissions of the certain message by the messaging system.

10. The method of claim 1, wherein the one or more processor examines the certain message for inclusion of a website hyperlink, transmits an identifier of the website hyperlink to a hits count service system, receives a returned hits count from the hits count service system and determines that content of the certain message has become popular based on the returned hits count received from the hits count service system exceeding a threshold.

11. The method of claim 1, wherein the one or more processor performs text to subject processing of the certain message to determine that the certain message has a certain subject classification, and wherein the one or more processor determines that content of certain message has become popular based on a count of transmitted messages of the messaging system having the certain subject classification exceeding a threshold.

12. The method of claim 1, wherein the one or more processor uses a hashtag of the certain message to determine that the certain message has a certain subject classification, and wherein the one or more processor determines that content of certain message has become popular based on a count of transmitted messages of the messaging system having the certain subject classification exceeding a threshold.

13. The method of claim 1, wherein the count of transmissions comprises a count of original message transmissions of the certain message.

14. The method of claim 1, wherein the count of transmissions comprises forwards of the certain message.

15. The method of claim 1, wherein the count of transmissions comprises replies to the certain message.

16. The method of claim 1, wherein the method includes the one or more processor determining a relevance of content of the certain message to the certain user, and wherein the one or more processor performs the transmitting the certain message stored in the data store to the certain user responsively to a result of the determining the popularity of content of the certain message and the determining a relevance of content of the certain message to the certain user, wherein the determining a relevance of content of the certain message to the certain user includes determining a relevance score of the certain message to the certain user using one or more of the following selected from the group consisting of: geographic preference data of the certain user, message history data of the certain user, personal activity data of the certain user, social activity data of the certain user, availability data of the certain user, and location data of the certain user.

17. The method of claim 1, wherein the method includes the one or more processor determining a relevance of content of the certain message to the certain user, and wherein the one or more processor performs the transmitting the certain message stored in the data store to the certain user responsively to a result of the determining the popularity of content of the certain message and the determining a relevance of content of the certain message to the certain user, wherein the determining a relevance of content of the certain message to the certain user includes performing text to subject classification processing of the certain message to determine that the certain message has a certain location subject classification of the certain message, and assigning a relevance score of the certain message to the certain user in dependence on a degree of relatedness between a location of the certain location subject classification of the certain message and a residence or business location of the certain user.

18. The method of claim 1, wherein the method includes the one or more processor determining a relevance of content of the certain message to the certain user, and wherein the one or more processor performs the transmitting the certain message stored in the data store to the certain user responsively to a result of the determining the popularity of content of the certain message and the determining a relevance of content of the certain message to the certain user, wherein the determining a relevance of content of the certain message to the certain user includes performing text to subject classification processing of the certain message to determine that the certain message has a certain location subject classification of the certain message, and assigning a relevance score of the certain message to the certain user in dependence on a degree of relatedness between a location of the certain location subject classification of the certain message and a current location of the certain user.

19. A computer program product, the computer program product comprising:
one or more non-transitory computer readable storage device; and
program instructions, stored on at least one of the one or more non-transitory computer readable storage device, executable by one or more processor for performing a method comprising:
identifying a certain message of a messaging system as a blocked message intended for transmission to a certain user of the messaging system that is blocked from being transmitted to the certain user, the certain user being a prospective recipient of the certain message, the method including blocking the certain message from being transmitted to the certain user, the blocking including storing the certain message into a data store;
determining a popularity of content of the certain message;
overriding the blocking to perform transmitting the certain message stored in the data store to the certain user responsively to a result of the determining a popularity of content of the certain message so that the certain user is made aware that the certain message has become popular, wherein the determining a popularity of content of the certain message includes determining a count of message transmissions of the certain message by the messaging system of the certain message within a time period, and determining that that certain message has become popular based on the messaging system observing a threshold exceeding count of transmissions of the certain message within the time period.

20. A computer system for transmitting blocked message information, the computer system comprising:
one or more processor, one or more computer-readable memory and one or more computer-readable, tangible storage device;
program instructions, stored on at least one of the one or more storage device for execution by at least one of the one or more processor via at least one of the one or more memory, to perform a method comprising:
identifying a certain message of a messaging system as a blocked message intended for transmission to a certain user of the messaging system that is blocked from being transmitted to the certain user, the certain user being a prospective recipient of the certain message, the method including blocking the certain message from being transmitted to the certain user, the blocking including storing the certain message into a data store;

determining a popularity of content of the certain message;

overriding the blocking to perform transmitting the certain message stored in the data store to the certain user responsively to a result of the determining a popularity of content of the certain message so that the certain user is made aware that the certain message has become popular, wherein the determining a popularity of content of the certain message includes determining a count of message transmissions of the certain message by the messaging system of the certain message within a time period, and determining that that certain message has become popular based on the messaging system observing a threshold exceeding count of transmissions of the certain message within the time period.

\* \* \* \* \*